US012632474B2

(12) United States Patent (10) Patent No.: US 12,632,474 B2
Kim et al. (45) Date of Patent: May 19, 2026

(54) CLUSTERING KEY SELECTION BASED ON MACHINE-LEARNED KEY SELECTION MODELS FOR DATA PROCESSING SERVICE

(71) Applicant: Databricks, Inc., San Francisco, CA (US)

(72) Inventors: Terry Kim, Bellevue, WA (US); Lin Ma, Ann Arbor, MI (US); Rahul Shivu Mahadev, Santa Clara, CA (US); Rahul Potharaju, San Ramon, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 19/022,884

(22) Filed: Jan. 15, 2025

(65) Prior Publication Data

US 2025/0156448 A1 May 15, 2025

Related U.S. Application Data

(63) Continuation of application No. 18/501,830, filed on Nov. 3, 2023, now Pat. No. 12,229,169.

(51) Int. Cl.
*G06F 16/28* (2019.01)
*G06F 16/21* (2019.01)
*G06F 16/22* (2019.01)

(52) U.S. Cl.
CPC .......... *G06F 16/285* (2019.01); *G06F 16/211* (2019.01); *G06F 16/2246* (2019.01)

(58) Field of Classification Search
CPC ... G06F 16/211; G06F 16/285; G06F 16/2246
See application file for complete search history.

(56) References Cited

U.S. PATENT DOCUMENTS

| | | | | |
|---|---|---|---|---|
| 9,384,571 B1 * | 7/2016 | Covell | ............... | G06F 16/2358 |
| 11,995,215 B2 * | 5/2024 | De Gaetano | ............ | G06F 21/64 |
| 2009/0043797 A1 * | 2/2009 | Dorie | .................... | G06F 16/355 |
| | | | | 707/999.102 |
| 2015/0331936 A1 * | 11/2015 | Alqadah | ................. | G06F 40/40 |
| | | | | 707/739 |
| 2022/0245322 A1 * | 8/2022 | Lundin | .................... | G06N 3/09 |
| 2025/0315781 A1 * | 10/2025 | Mesard | ............. | G06Q 30/0633 |

* cited by examiner

*Primary Examiner* — Etienne P Leroux
(74) *Attorney, Agent, or Firm* — Fenwick & West LLP

(57) ABSTRACT

The disclosed configurations provide a method (and/or a computer-readable medium or system) for determining, from a table schema describing keys of a data table, one or more clustering keys that can be used to cluster data files of a data table. The method includes generating features for the data table, generating tokens from the features, generating a prediction for each token by applying to the token a machine-learned transformer model trained to predict a likelihood that the key associated with the token is a clustering key for the data table, determining clustering keys based on the predictions, and clustering data records of the data table into data files based on key-values for the clustering keys.

20 Claims, 8 Drawing Sheets

Obtain table schema describing keys of a
data table
502

Generate features for the data table
504

Generate tokens from the features
506

Generate predictions by applying a machine-
learned transformer model to the tokens
508

Determine clustering keys based on the
values of the predictions
510

Cluster data records into data files based on
values for the clustering keys
512

CLUSTERING KEY SELECTION BASED ON MACHINE-LEARNED KEY SELECTION MODELS FOR DATA PROCESSING SERVICE

CROSS REFERENCE TO RELATED APPLICATION

This application is a continuation of prior, co-pending U.S. application Ser. No. 18/501,830, filed on Nov. 3, 2023, which is incorporated herein by reference in its entirety for all purposes.

TECHNICAL FIELD

The described embodiments pertain in general to processing data for data file storage, and in particular to processing data for clustering data files using machine-learned models.

BACKGROUND

A data processing service may manage a significant amount of data for one or more entities in various forms, such as raw data or data tables. A data table may include a plurality of records or instances, where each record includes values for one or more keys. The data processing service may manage data tables with many records as one or more data files, in which a data file includes a respective subset of records of a data table. Thus, the data processing service may manage large file repositories.

In some instances, the data processing service performs a clustering process to change the layout of the data or change the distribution of the data with respect to one or more key-values of one or more keys, such that records with similar key-values for a given key are collocated in the same data file. A key-value is a value for a key in the data table (e.g., user or date column). A key in a data table that is used to group or "cluster" the data together by key-value may be referred to as a clustering key. In this manner, when performing read operations that are only relevant to records with certain key-values for certain clustering keys in the data table, the data processing service can skip data files that do not have relevant key-values, saving computing resources. However, for the data processing service to perform the clustering process, a user or administrator of the service is required to manually determine one or more clustering keys with which to group the data by key-value. Manual selection of clustering keys may result in non-optimal clustering keys being used in the clustering process, which may result in the data processing service having to read more data files than necessary, expending both time and computing resources.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure (FIG. 1A is a high-level block diagram of a system environment for a data processing service, in accordance with an embodiment.

Figure 1A:
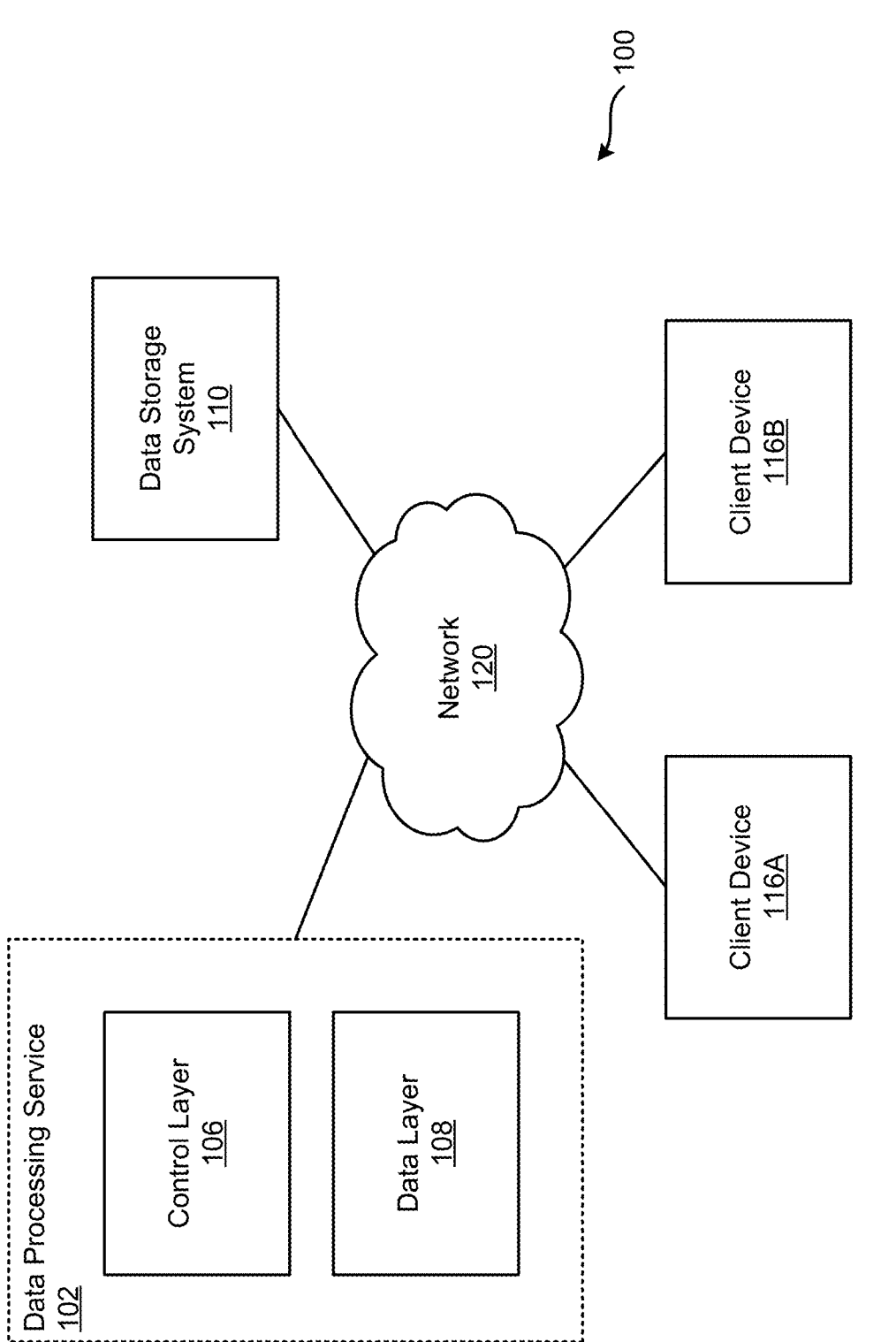
FIG. 1B illustrates an exemplary embodiment of a KD-classifier tree, in accordance with an embodiment.
FIG. 1C illustrates an inference process for using a machine-learned clustering key selection model to generate clustering key predictions, in accordance with an embodiment.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

The disclosed configurations provide a method (and/or a computer-readable medium or system) for determining, from a table schema describing keys of a data table, one or more clustering keys that can be used to cluster data files of a data table. The method includes feeding features from the table schema into a large language model (LLM) trained to predict whether a key in the table schema should be a clustering key. In one instance, manually selecting which keys should be clustering keys for a data table may be arbitrary and may result in sub-optimal performance for future read and write operations for the data table. By training and deploying a machine-learned selection model that is trained on large amounts of data, a data processing service selects and present clustering keys that are estimated to be good candidates for clustering to the user, and is a technical improvement over prior methods of selecting clustering keys.

A data table may include a set of records, where each record may include values for one or more keys. A key may represent a measurable piece of data that can be used for analysis, such as, login account, timestamp, etc. A key may refer to any characteristic of the data that can be associated with one or more values of various data types, such as discrete or continuous values, string values, and the like. A clustering key is a key in a data table that is used to group or "cluster" records together by key-value.

In one embodiment, as described in more detail below, the clustering for data files of a data table is performed using a data classifier tree. Responsive to selecting one or more clustering keys for a data table, a data classifier tree splits records into groups based on the key-values of the records corresponding to the clustering key(s). A data classifier tree for a data table may be configured as a KD-classifier tree and include a plurality of nodes and edges. A node of the data classifier tree may represent a splitting condition with respect to key-values for a clustering key. A node of the data classifier tree may be associated with one or more data files assigned to the node. The data files assigned to the node each include a subset of records having key-values that satisfy the conditions represented by the node and parent nodes of the node. By using the data classifier tree, the data processing service may efficiently cluster the data in the data table while reducing the number of data files that are rewritten when data is modified or added to the data table.

System Environment for Data Processing Service

FIG. 1A is a high-level block diagram of a system environment 100 for a data processing service 102, in accordance with an embodiment. The system environment 100 shown by FIG. 1 includes one or more client devices, e.g., 116A, 116B (generally 116), a network 120, a data processing service 102, and one or more data storage systems 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing service 102 may receive requests from users of client devices 116 to perform one or more data processing functionalities on data stored, for example, in the data storage system 110. The requests may include query requests, analytics and intelligence requests, or machine learning and artificial intelligence requests, on data stored in the data storage systems 110. The data processing service 102 may provide responses to the requests to the users of the client devices 116 after they have been processed.

In one embodiment, as shown in the system environment 100 of FIG. 1A, the data processing service 102 includes a control layer 106 and a data layer 108. The components of the data processing service 102 may be configured on one or more servers and/or a cloud infrastructure platform. In one embodiment, the control layer 106 receives data processing requests and coordinates with the data layer 108 to process the requests received from the client devices 116. The control layer 106 may schedule one or more jobs related to a request or receive requests to execute one or more jobs from the user directly through a respective client device 116. The control layer 106 may distribute the jobs to components of the data layer 108 where the jobs are executed.

In one embodiment, the data processing service 102 provides a method by which a data classifier tree for managing data files of a data table is generated, and one or more maintenance or read operations to the data table are performed based on the tree. In one embodiment, one or more clustering keys for a data table is selected. In one embodiment, the clustering keys are selected via a trained machine-learned model as described in more detail below. For example, a data table including user login data to a website may include keys or features such as user identifier (ID), login timestamp, machine type, and the like. As an example, the clustering key selection process may select the user ID and the login timestamp as the clustering keys.

The nodes of the data classifier tree represent conditions with respect to key-values for one or more clustering keys, and in one instance, two or more clustering keys. A node of the data classifier tree is associated with one or more data files that are assigned to the node of the data classifier tree. The data files assigned to a node may each include a subset of records having key-values satisfying the conditions for the node and parent nodes of the node. The node, if a parent node, may also store information on pointers to one or more child nodes in a layer below the parent node.

Figure 1B:
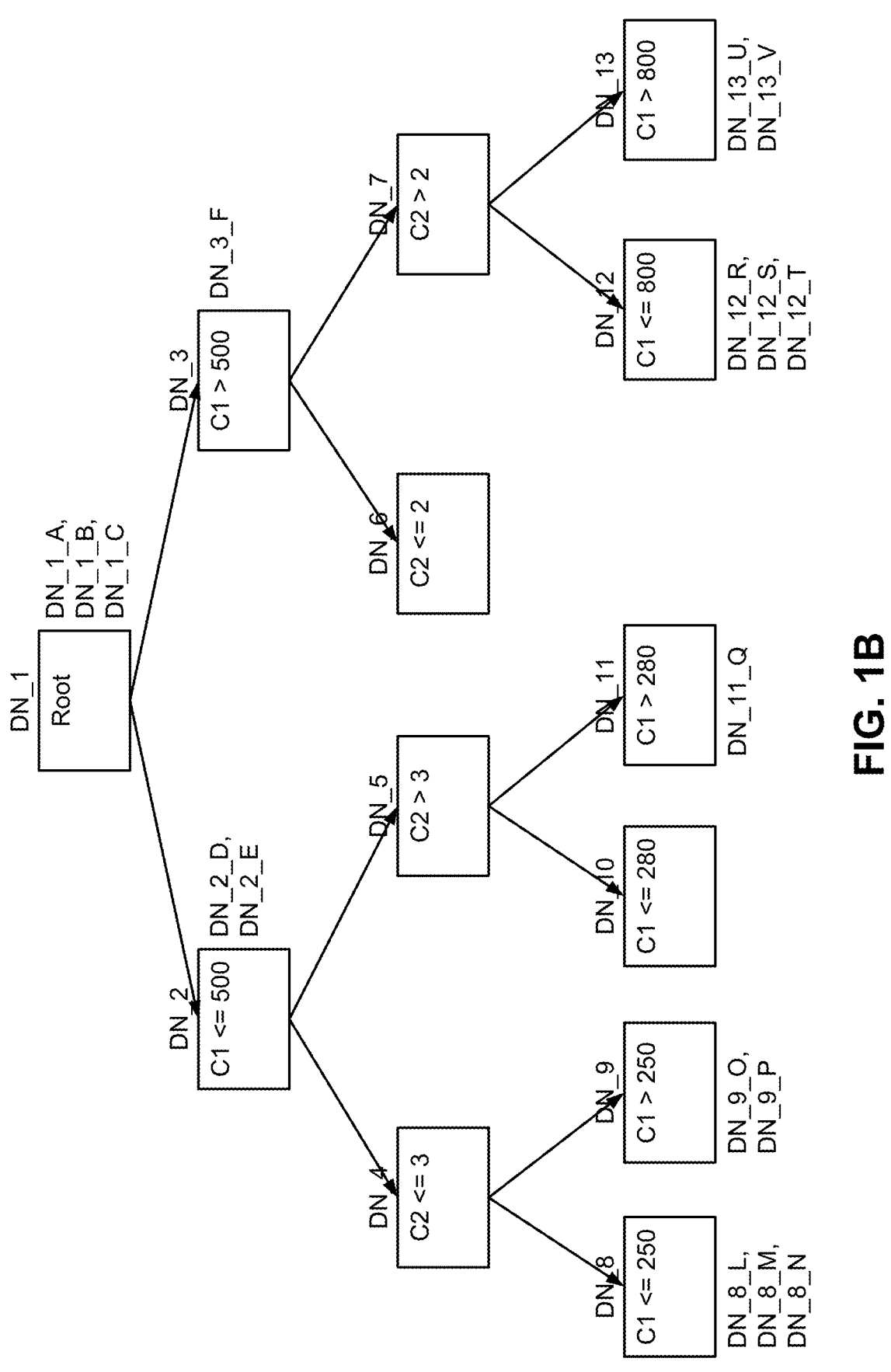

FIG. 1B illustrates an example data classifier tree, in accordance with an embodiment. The data classifier tree may be stored in association with a data table in the data storage system 110. As illustrated in FIG. 1B, the data classifier tree includes a root node DN_1, one or more intermediate nodes DN_2, DN_3, DN4, DN_5, DN_6, DN_7, and one or more leaf nodes DN_8, DN_9, DN_10, DN_11, DN_12, DN_13 that do not have child nodes. In the data classifier tree of FIG. 1B, each node in the data classifier tree may be associated with one or more data files stored in the data storage system 110 that is assigned to the node. For example, data files DN_1_A, DN_1_B, DN_1_C are assigned to the root node DN_1. As another example, data file DN_3_F is assigned to intermediate node DN_3. As yet another example, data files DN_12_R, DN_12_S, DN_12_T are assigned to leaf node DN_12.

In one embodiment, the nodes of the data classifier tree represent conditions with respect to key-values for one or more clustering keys, and specifically in one instance, two or more clustering keys. For example, in the data classifier tree of FIG. 1B, the nodes of the data classifier tree may alternate between splitting the data of a respective data table with respect to key-values for a first clustering key (e.g., values for clustering key "C1" representing user ID's) at one level of the data tree, and a second clustering key (e.g., values for clustering key "C2" representing time stamp users logged in) at the next level of the data classifier tree, and this ordering may be repeated for remaining levels throughout the depth of the data classifier tree. Once a data classifier tree has been constructed using the selected clustering keys, data ingested, modified, otherwise updated for the data table may be arranged into data files as illustrated in the example of FIG. 1B, such that data with similar key-values are co-located in the same data files.

However, it is appreciated that in other embodiments, the conditions may be represented differently and can be alternated differently depending on how many clustering keys are represented by the data classifier tree and depending on other considerations such as the desired granularity of data skipping for each of the clustering keys. For example, these other embodiments may include nodes with conditions regarding the key-values of the same clustering key that is used in the condition of their parent node, and trees where the conditions of nodes at the same depth in the tree are not with respect to the key-values of the same clustering key.

In one embodiment, the data files including a set of records are assigned to a respective node in the data classifier tree that is the deepest node in the data classifier tree that satisfies the conditions of the key-values of the records in the data file. For example, a data file with key-values for C1 in the range [1, 489] and key-values for C2 in the range [3.2, 5.6] can be assigned to node DN_5. As another example, a data file with key-values for C1 in the range [281, 489] and key-values for C2 in the range [3.2, 5.6] can be assigned to node DN_11. However, it is appreciated that in other embodiments, data files can be assigned to any node in the data classifier tree for which the key-values for the clustering keys in the data file satisfy the conditions represented by the node (e.g., any parent node of DN_11). In one embodiment, the data classifier tree described herein is configured as a binary tree, where each node has two child nodes. However, it is appreciated that in other embodiments, a node may have any number of child nodes and can be configured as a general tree. In some other embodiments, all non-leaf nodes must have the same number of child nodes, while in other embodiments, different nodes are allowed to have different numbers of child nodes.

While the example data classifier tree in FIG. 1B illustrates a tree with 13 nodes, this is for the sake of simplicity, and it is appreciated that in other embodiments, the data table may have a significantly larger number of data files, and thus, in general a larger number of nodes in a data classifier tree. For example, in a data table including millions or billions of data files, the data classifier tree may include millions of nodes each describing a splitting condition for a respective clustering key. For example, the data classifier tree may have 30,000 leaf nodes and 25,000 internal nodes including the root node. Each leaf node may be assigned to approximately 30,000 data files that each have records satisfying the conditions for the two or more clustering keys.

Thus, data files assigned to a respective node in the data classifier tree may include records with a narrower range of key-values compared to those of a parent node, since a greater number of splitting conditions are imposed on the node than the parent node. In other words, within a space defined based on the clustering keys for the data classifier tree, the key-values of data files assigned to a respective node are bounded based on the splitting condition for the node and conditions associated with a parent node of the node. Thus, the bounding box for the respective node may be smaller than a bounding box for a parent node, and therefore, the records assigned to the respective node are clustered at a higher degree than the records for the parent node. In other words, the data in data files of a parent node may have a wider range of key-values for the set of clustering keys than data in data files assigned to a respective child node, and the data files may have varying levels of clustering throughout the depth of the data tree. As records of data files are clustered with a higher level of granularity (i.e., records of data files are assigned to nodes at deeper levels of the data classifier tree), read operations like query operations with a desired range of key-values of interest can be performed with significant data skipping, in which data files with key-values that are irrelevant to the desired range do not have to be read for the query. This allows the operations to be performed faster and in a computationally efficient manner.

In one embodiment, the data processing service 102 receives requests to ingest one or more records to a data table stored in the data storage system 110. The data table may include a set of records that each include values for one or more clustering keys. The data processing service 102 accesses a data classifier tree for the data table. The data processing service 102 traverses the data classifier tree to identify at least one node for which key-values of the two or more clustering keys in the one or more records satisfy conditions for the identified node and ancestor nodes of the identified node. The ancestor nodes of the identified node are the collection of the node's parent node, and the parent node of the node's parent node, and so on, up to the root of the data classifier tree. In one instance, the identified node is the deepest node in the data classifier tree for which the records in the data file satisfies the conditions for.

The data processing service 102 writes the records to a data file (e.g., to the data storage system 110) in association with the identified node of the data classifier tree. For example, in the data classifier tree of FIG. 1B, the data processing service 102 requests a data file to be written in association with the root node DN_1 of the data classifier tree, another data file to be written in association with the node DN_6 of the data classifier tree, and so on. In one instance, one or more existing data files associated with the data classifier tree are rewritten to incorporate the one or more records. In another instance, the one or more records are added to a data table by adding new data files including the records to the data table and associating the new data files to respective nodes of the data classifier tree. In one instance, a data file is written to an assigned node of the data classifier tree by including a node identifier (e.g., DN_1, DN_2, and so on) in the name of the data file as illustrated in FIG. 1B. A more detailed description of the data ingestion process is described below.

In one embodiment, the data processing service 102 receives a request to ingest a plurality of records, which may be provided in the form of one or more data files, or through a network data transfer, or through a queueing system, database access, or by applying a transformation on one or more data sources to produce records, and the like. In such an embodiment, the data processing service 102 can perform an optional pre-processing step on the requested data before the actual ingestion of the records. This allows, for example, the data processing service 102 to cluster and reorganize records in the data files before adding the records to the data table using the data classifier tree.

In some existing implementations of clustering, the data files for a data table are clustered according to a clustering method such as a Z-order method in which records with similar key-values are co-located in the same data files. In such an embodiment, the data processing service 102 may generate local groupings (e.g., Z-cubes) in which a chunk of clustered data files are stored together. As an example, one grouping (e.g., one Z-cube) may include approximately 100 GB of data, resulting in 1,000 data files. However, when a set of new records have to be written to a local grouping or existing data files within a local grouping are updated, typically the entire data in the grouping has to be rewritten, resulting in lack of incrementality and significant latency and use of computational power.

However, by maintaining a data classifier tree that allows various levels of clustering by assigning data files to nodes of various levels of the data classifier tree, the data processing service 102 may store the set of records by assigning the data file to a respective node of the data classifier tree, without major rearrangement of the remaining data files of the data table. Moreover, the data processing service 102 may also perform one or more maintenance operations based on the data classifier tree to rearrange data files of a data table. One type of maintenance operation is when a large number of data files, or a large amount of data, are assigned to an internal node of the data classifier tree, rewriting the data files in such a way that the rewritten data files are clustered further and can be assigned to child or descendant nodes.

Another type of maintenance operation is when a large number of data files (e.g., 10,000 files) are assigned to a leaf node of the data classifier tree, splitting the leaf node by adding child nodes to further classify the data files with higher level of granularity, and possibly rewriting the data files in such a way that the rewritten data files can be assigned to the newly created child nodes. Yet another type of maintenance operation is when a small number of data files are assigned to leaf nodes of the data classifier tree, compacting the data files of this set of leaf nodes such that the files are merged and assigned to the parent node of the leaf nodes (i.e., eliminating the leaf nodes). Even when performing such maintenance operations, while the subset of data files associated with the relevant nodes may be updated and rewritten, the majority of the remaining data files of the data table may remain undisturbed.

Returning to the system environment 100 of FIG. 1A, the control layer 106 of the data processing service 102 is additionally capable of configuring clusters in the data layer 108 that are used to execute the requests. For example, a user of a client device 116 may submit a request to perform one or more query operations and may specify that a number of clusters (e.g., four clusters) on the data layer 108 be activated to process the request with certain memory requirements. Responsive to receiving this information, the control layer 106 may send instructions to the data layer 108 to activate the requested number of clusters and configure the clusters according to the requested memory requirements.

In one embodiment, the data processing service 102 performs one or more operations to train a clustering key selection model to select a set of clustering keys for a data table of a user, generate a corresponding data classifier tree (e.g., or some other clustering mechanism) using the selected clustering keys, and ingest data files according to the clustering mechanism based on the values of the selected clustering keys. In one embodiment, the data processing service 102 determines clustering keys based on a table schema for the data table. The control layer 106 makes this determination using an inference process using the trained clustering key selection model, described with respect to FIG. 1C.

Figure 1C:
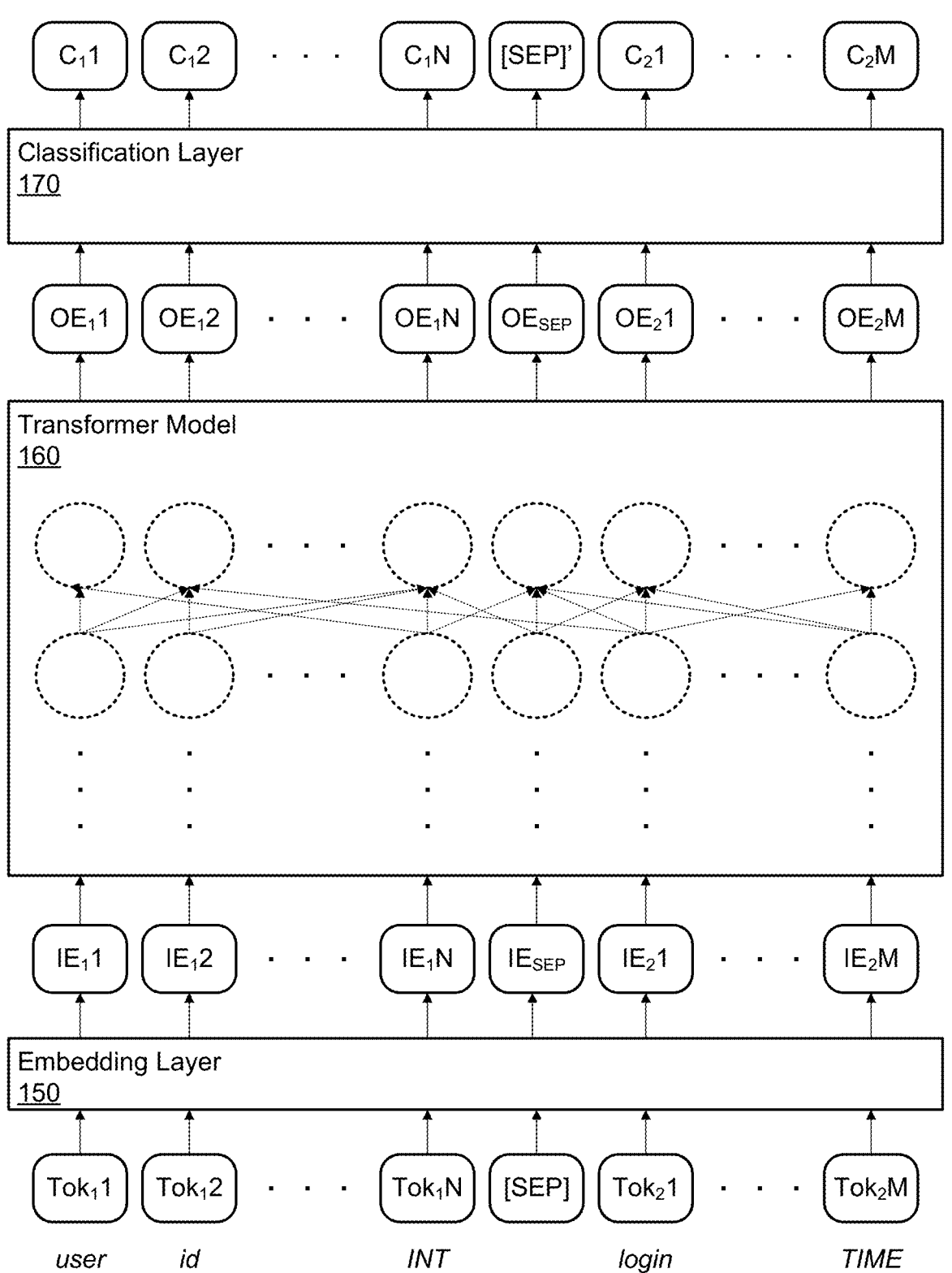

FIG. 1C illustrates an inference process for using a machine-learned clustering key selection model trained to generate predictions for whether a key is a good candidate for a clustering key for a data table, according to one embodiment. In one embodiment, the clustering key selection model includes an embedding layer 150, a transformer model 160, and a classification layer 170. The machine-learned transformer model is configured to receive tokens corresponding to features of keys described by the table schema as input and to output classification predictions for each token.

In one embodiment, the clustering key selection model or portions thereof may be configured as a neural network with layers of interconnected nodes. The clustering key selection model may be a machine-learned transformer model, and as such include encoders or decoders. Each encoder or decoder of the transformer model may include one or more attention layers. Each attention layer takes query, key, and value as inputs, and generates an attention score as an output. Attention scores generated by attention layers may be passed to other layers of the transformer model. In some embodiments, portions of the clustering key selection model may be configured as deep neural networks (DNN), convolutional neural networks (CNN), recurrent neural networks (RNN), long short-term memory networks (LSTM), bi-directional encoder representations from transformers (BERT), generative pre-trained (GPT) models, or any combination thereof.

During the inference process and after a training process of training the clustering key selection model, the control layer 106 obtains a table schema corresponding to a data table. The data in the data table may be stored at a storage system associated with data processing service 102, for example stored in data layer 108 or data storage system 110.

The table schema defines how the data is organized in a data table, describing at least one or more keys of the data table and may include the one or more keys separated by delineators such as commas and/or line breaks. The table schema includes, for each key, a name and a data type for the key. The name of each key may be input by a user and may be arbitrary. For example, for data containing ages of users, a key name could be "age," "years_old," "column1," or any other name specified by the user. The data type specifies the particular kind of data that the key refers to. For example, for data containing ages of users, the data type may be "INT," meaning that the data are integers. In some embodiments, the control layer 106 may receive the table schema from a user. In other embodiments, the control layer may automatically generate the table schema based on a set of data stored in the data storage system 110 and any metadata the data processing service 102 has obtained for that data table.

The control layer 106 generates a set of features for the data table. The features for the data table include the features for each key. The features for each key include at least the name of the key and the data type of the key. For example, for a key with name "user_id" and data type "INT," the control layer 106 may generate two features, "user_id" and "INT." As previously mentioned, the table schema is received from a user, and key names may not be standard in nature. The key name "user_id," for instance, may alternatively be written as "userid," "userId," "userID," or any other variation.

The control layer 106 generates a set of tokens from the set of features. A token is an encoding or numerical representation, and a set of tokens may represent a feature in the numerical or latent space. A token may be a one-hot encoding vector, a vector that includes a set of elements each corresponding to a word or sub-word of a feature, where the element corresponding to a particular feature has the value one and the remaining elements have the value zero. A token may be a dense vector where relationships between features may be indicated by the closeness of their vectors. For each feature, the control layer 106 may generate one or more corresponding tokens. For example, for the feature "user_id," the control layer 106 may generate two tokens, one token corresponding to "user" and one token corresponding to "id." For the feature "INT," the control layer 106 may generate a single token.

The control layer 106 may arrange the generated tokens in a series. For example, the series may start with a first token representing the name of the first key in the table schema (e.g., "user_id"), or, when the name of the first key includes multiple words, a token representing the first word in the name (e.g., "user"). The series may continue with a second token representing a second word in the name (e.g., "id"), if applicable, and so on until all words in the name of the first key are represented. The series may further continue with a token representing the data type of the first key.

As an example, in FIG. 1C, the first set of N tokens $Tok_1 1, \ldots, Tok_1 N$ correspond to the features of the first key, with the first N−1 tokens corresponding to the name of the key and the $N^{th}$ token corresponding to the data type of the key. To keep with the previous example, $Tok_1 1$ and $Tok_1 2$ respectively represent the words "user" and "id" from the name of the first key, while $Tok_1 3$ (where N is equal to 3) represents the word "INT" from the data type of the first key. The series may continue with tokens corresponding to the second key, arranged in a similar manner to the tokens in the first key. In FIG. 1C, the second set of M tokens $Tok_2 1, \ldots, Tok_2 M$ correspond to the features of the second key, with the first M−1 tokens corresponding to the name of the key and the $M^{th}$ token corresponding to the data type of the key. For example, say the table schema included a second key with the name "login timestamp" and date type "TIME", $Tok_2 1$ would represent the word "login" from the name of the second key, $Tok_2 2$ would represent the word "timestamp," while $Tok_2 3$ would represent the word "TIME" from the data type of the second key.

While the example implementation illustrated in FIG. 1C includes two keys, in practice the implementation is not limited to two keys. The series of tokens may continue such that all features of all keys are represented for the data table. In some embodiments, the control layer 106 may introduce one or more separation tokens, [SEP]. The control layer 106 may optionally introduce separation tokens between tokens corresponding to different keys, for example in between a token representing the name of one key (e.g., $Tok_1 N$) and the data type of a following key (e.g., $Tok_2 1$).

The control layer 106 generates a set of predictions by applying the clustering key selection model to the set of tokens. In one embodiment, applying the clustering key selection model involves passing information through three layers, the embedding layer 150, the transformer model 160, and the classification layer 170.

The embedding layer 150 receives the series of tokens generated by the control layer 106 and generates a set of input embeddings. An input embedding is a numerical representation of a token in a latent space. For every token, the embedding layer 150 generates a corresponding input embedding. For example, for the token $Tok_1 1$, the embedding layer 150 generates an input embedding $IE_1 1$.

The transformer model 160 receives input embeddings from the embedding layer 150 and generates output embeddings. Like an input embedding, an output embedding is a representation of a corresponding token in a latent space. However, different from the input embedding, the output embedding for a respective token may represent the token in the latent space that takes into account context given by the other tokens in the input surrounding the particular token. In one embodiment, the transformer model 160 is a "bidirectional encoder representations from transformers" (BERT) model and includes a set of attention layers. The transformer model 160 generates an output embedding (e.g., hidden state) for each input embedding. For example, for the input embedding $IE_1 1$, the transformer model 160 generates an output embedding $OE_1 1$.

The classification layer 170 receives the output embeddings from the transformer model 160 and generates classification predictions for the tokens. For each token, the classification layer 170 generates a classification prediction. For example, for the token $Tok_1 1$ with output embedding $OE_1 1$, the classification layer 170 generates a classification prediction $C_1 1$. A classification prediction is a numerical value that represents the likelihood that the key associated with a token is a clustering key for the data table. Classification prediction values close to 1 may strongly indicate that the key is a strong candidate for being a part of a clustering key for the data table while values close to or below 0 may indicate that the key is not a strong candidate for being a part of clustering key for the data table.

The control layer 106 determines one or more clustering keys based on the values of the classification predictions for the tokens. For each key of the data table, the control layer 106 may compute a clustering prediction score based on the classification predictions for the tokens for the key. In some embodiments, the control layer 106 computes the clustering prediction score for a key based on the classification predictions for one or more tokens corresponding to the key name. In one instance, the control layer 106 generates the clustering prediction score for a key based on the classification prediction generated for the first token in the feature for the name of the key. In such an instance, the machine-learned model is trained such that the predictions for the first token in the name of a key corresponds to the estimated clustering prediction score for the key. In one example, for a key with name "user_id," where the first token for the word "user" has classification prediction 0.87, the control layer 106 may compute the clustering prediction score for the key as 0.87, based on the classification prediction for the first token of the key. However, it is appreciated that in other embodiments, the data processing service 102 may use the predictions for other tokens of the data table to generate the clustering prediction score for a key.

The control layer 106 may use the clustering prediction scores to determine one or more clustering keys. In some embodiments, the control layer 106 may determine clustering keys to be a set number of keys with the highest clustering scores (e.g., the keys with the three highest clustering scores). In some embodiments, the control layer 106 may determine clustering keys to be keys with clustering scores above a threshold clustering score (e.g., clustering score greater than 0.8). The control layer 106 uses the determined clustering keys to cluster records of the data table into or more data files. In one embodiment, the selected set of clustering keys are used to construct the data classifier tree (e.g., data classifier tree of FIG. 1B).

Returning to the system environment 100 of FIG. 1A, the data layer 108 includes multiple instances of clusters of computing resources that execute one or more operations received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. A tenant of the data processing service 102 may be an entity (e.g., business organization, university, individual user) that may be associated with an established account of the data processing service 102. The data processing service 102 may allocate storage to store data for a tenant and/or computing resources to perform one or more processing operations on the data for the tenant. For example, a respective data layer instance can be implemented for each respective tenant. However, it is appreciated that the data layer 108 can also be configured as a single tenant architecture.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data configured on a cloud platform and may include a commercially provided distributed storage system service. Thus, the data storage system 110 may be managed by the same entity that manages the data processing service 102 or by a separate entity than an entity that manages the data processing service 102. In one embodiment, the data storage system 110 may be included in the data layer 108.

The client devices 116 are computing devices that provide for display of information to users and communicate user actions to the systems of the system environment 100. While two client devices 116A, 116B are illustrated in FIG. 1, in practice many client devices 116 may communicate with the systems (e.g., data processing service 102) of the system environment 100. In one embodiment, a client device 116 is a conventional computer system, such as a desktop or laptop computer. As another example, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one example embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the systems of the system environment 100 through a web interface or an application programming interface (API) running on a native operating system of the client device 116, such as IOS® or ANDROID™

Data Storage System

Figure 2:
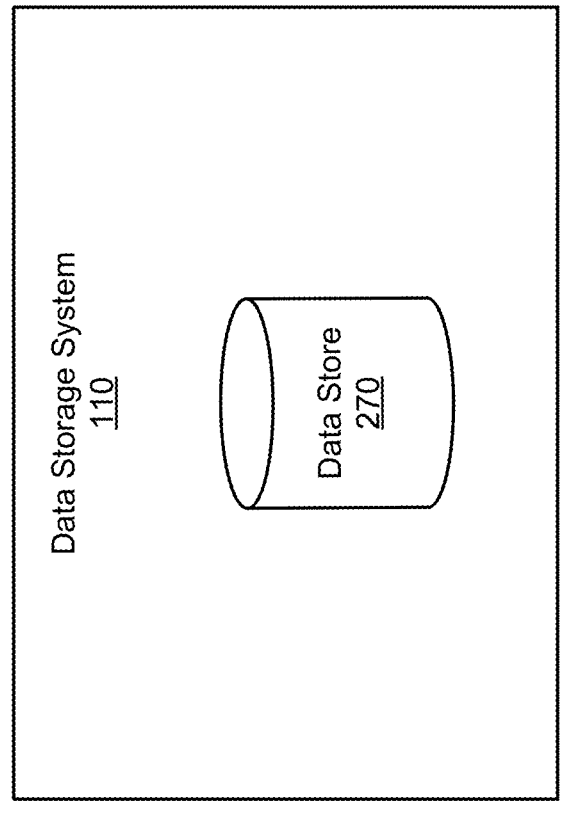
FIG. 2 illustrates a block diagram of an architecture of the data storage system, in accordance with an embodiment.

FIG. 2 illustrates a block diagram of an architecture of the data storage system 110, in accordance with an embodiment. As illustrated in FIG. 2, the data storage system 110 includes a data store 270. The data storage system 110 may have multiple instances of the data store 270, each instance dedicated to storing data for a tenant of the data processing service 102. In one embodiment, the data store 270 stores data in a format of a data table. A data table may include a set of records, where each record may include values for one or more keys. A key may represent a measurable piece of data that can be used for analysis, such as, login account, timestamp, etc. A key may refer to any characteristic of the data that can be associated with one or more values of various data types, such as discrete or continuous values, string values, and the like. In one embodiment, the records may span across multiple rows of the data table and the keys may span across multiple columns of the data table. In other embodiments, the records may span across multiple columns and the keys may span across multiple rows. For example, a data table associated with a company may include a plurality of records each corresponding to a login instance of a respective user to a website, where each record includes values for a set of keys including user login account, timestamp of attempted login, whether the login was successful, and the like.

As described above, a data table in the data store 270 may be stored in conjunction with a data classifier tree configured as a KD-classifier tree. Thus, the data files of the data table may be stored in accordance with the data classifier tree. For example, a data file may be assigned to a node of the data classifier tree and may include a node identifier in the name of the data file, and the key-values of in the records of the data file may satisfy conditions represented by the node and parent nodes of the node. However, in other embodiments, it is appreciated that the data file may be associated with a respective node in the data classifier tree by alternative methods.

Control Layer

Figure 3:
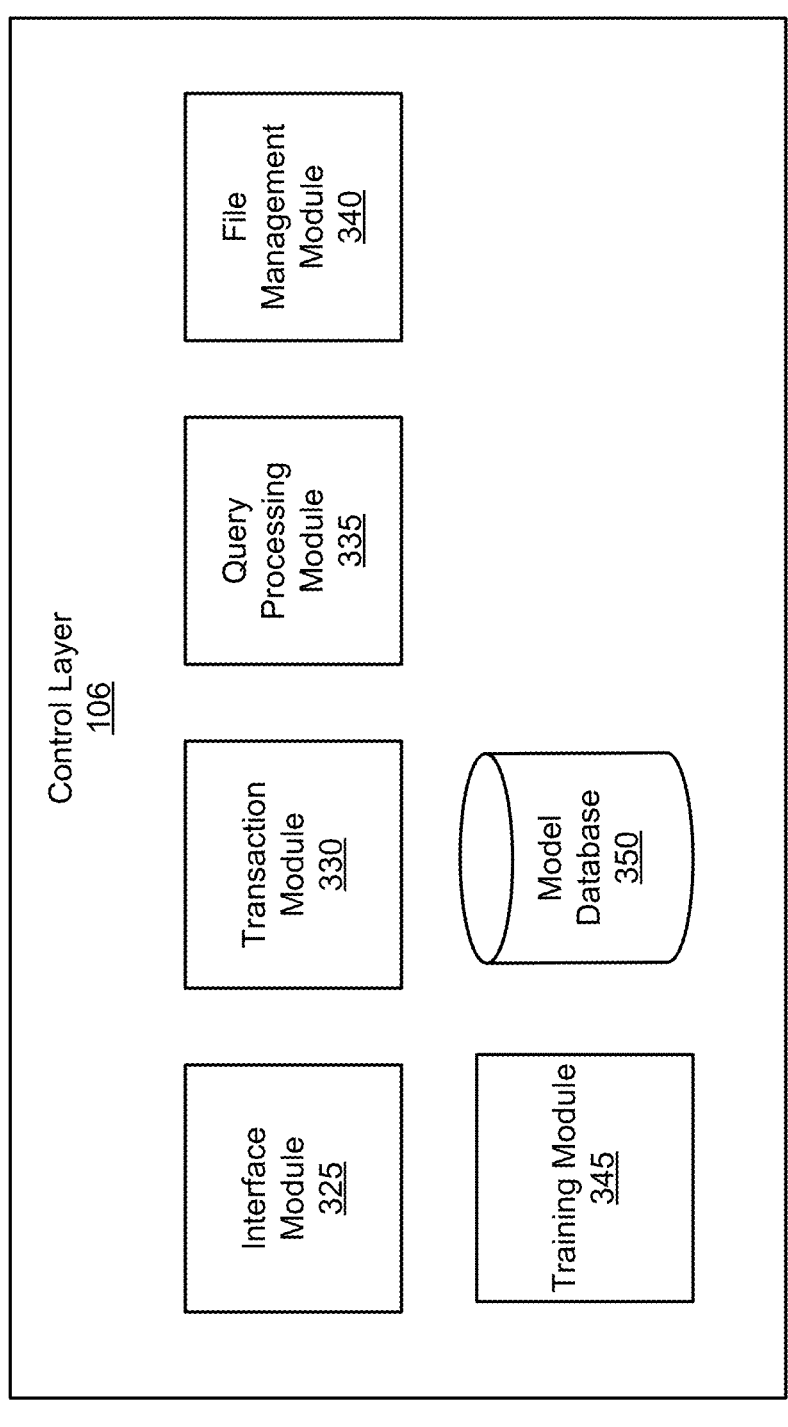
FIG. 3 is a block diagram of an architecture of a control layer, in accordance with an embodiment.

Referring now to FIG. 3, illustrated is a block diagram of an architecture of a control layer 106, in accordance with some example embodiments. As shown, the control layer 106 includes an interface module 325, a transaction module 330, a query processing module 335, a file management module 340, a training module 345, and model database 350.

The interface module 325 provides an interface and/or a workspace environment where users of client devices 116 (e.g., users associated with tenants) can access resources of the data processing service 102. For example, the user may retrieve information from data tables associated with a tenant and submit data processing requests, such as query requests on the data tables, through the interface provided by the interface module 325. The interface provided by the interface module 325 may include electronic notebooks, libraries, experiments (e.g., data and/or analysis), and/or queries submitted by the user. In some embodiments, a user may access the workspace via a user interface (UI), a command line interface (CLI), and/or through an application programming interface (API) provided by the interface module 325.

In some embodiments, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, clustering keys, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 1A, a request to perform a transaction operation may represent one or more changes to the data table. For example, the transaction may be to insert new records into a data table, replace existing records in the data table, delete records in the data table, and the like.

In some embodiments, the transaction module 330 receives a request to perform a transaction operation that writes or ingests a set of data files into a data table. For example, the request may be to add new records or update existing records of the data table. The transaction module 330 may provide instructions to the data layer 108 such that the cluster resources of the data layer 108 retrieve the data files from the data storage system 110 and process the set of records to perform the transaction operation. When the data table is clustered according to a data classifier tree, the transaction module 330 provides the request or information on the set of data files to the file management module 340. The transaction module 330 may receive instructions on how the one or more data files should be stored in accordance with the clustering of the data classifier tree. For example, the instructions from the file management module 340 may specify one or more node identifiers each data file should be assigned to in the data classifier tree, and the data files may be stored to the data store 270 of the data storage system 110 with a name including the node identifier.

The query processing module 335 receives and processes queries that access data stored by the data storage system 110. The queries processed by the query processing module 335 are referred to herein as database queries. For example, the database queries may be specified using a declarative database query language such as the SQL. The query processing module 335 compiles a database query specified using the declarative database query language to generate executable code that is executed. In one embodiment, the query processing module 335 provides one or more queries to appropriate clusters of the data layer 108 and receives responses to the queries from clusters in which the queries are executed.

In one embodiment, the query processing module 335 provides information on the query including a desired range of key-values for one or more keys to the file management module 340. The query processing module 335 receives a subset of identified data files that should be read for the query operation. Specifically, the query processing module 335 may read the data file and identify records that overlap with the desired key-value range to process the query. Since the data classifier tree enables data skipping, the subset of data files that are read for the query are significantly smaller than the number of data files that compose the data table.

The file management module 340 generates a data classifier tree for one or more data tables stored in the data storage system 110. In some embodiments, the file management module 340 generates a data classifier tree for a data table having a set of clustering keys by recursively dividing the records of the data table according to key-values for each clustering key. For example, the file management module 340 selects a splitting condition with respect to a clustering key for the nodes of the second level of the data classifier tree (i.e., children nodes of the root node) such that approximately half (or a threshold proportion or number) of the records of the data table can be split into each child node. The file management module 340 may then select another splitting condition with respect to another clustering key for the nodes of the third level of the data tree (i.e., child nodes of the intermediate nodes) such that approximately half (or a threshold proportion or number) of the records that belong to each intermediate node can be further split into each child node, and so on, until certain nodes have below a threshold proportion of records that are associated with the node. These nodes may be defined as the leaf nodes.

In some embodiments, the file management module 340 receives the clustering keys from an administrator of the data processing service or from a user of a client device 116. In some embodiments, the file management model determines the clustering keys of the data table by applying the trained clustering key selection model as described in conjunction with FIG. 1C to the keys described by the data schema corresponding to the data table. For each key, the file management module 340 inputs tokens corresponding to features of the key into the trained clustering key selection model to generate classification predictions for each key. The file management module 340 computes a clustering prediction score for each key based on the classification predictions for the features of the key. The file management module 340 determines one or more clustering keys based on the clustering prediction scores of the keys.

In some embodiments, the file management module 340 receives a request from the transaction module 330 that includes information on a set of records to be written to a data table that is clustered according to a data tree. The information may include the size of the set of records and the data distribution of the key-values of the set of records. For a data file, the file management module 340 identifies a node of the data classifier tree that the data file can be assigned to. The file management module 340 provides the node identifiers for the set of ingested data files to the transaction module 330, such that the transaction module 330 can store the data files in association with the identified nodes of the data classifier tree.

In one embodiment, the file management module 340 also performs one or more maintenance operations to further cluster the data files, compact the data files into a smaller number of data files, and the like. For example, the file management module 340 may determine that a large number of data files are assigned to the root of the data classifier tree, and further divide the set of data files at the root node to assign them to children nodes of the root node. For example, a larger write of data files assigned to a root node of the data classifier tree may be rewritten and partially clustered to the next level of nodes in the data classifier tree. However, this may still be helpful since it immediately allows some degree of data skipping.

As another example, the file management module 340 may determine a significant number of smaller data files that were newly ingested, and perform a compaction to generate a single data file that integrates the data across the 1,000 data files into a single data file. By identifying which data files are assigned to respective nodes of the data classifier tree, the file management module 340 can easily determine data files that need further maintenance operations. The file management module 340 may determine which files need further clustering based on the data file sizes and also whether the data files are assigned to relatively shallow nodes (e.g., root node and upper intermediate nodes) of the data classifier tree.

While the data classifier tree may be also constructed with respect to a single key, this may result in a data tree that is disproportionately deeper for certain traversal paths. For example, when the key-value is a timestamp, the bulk of newly ingested records may have timestamps that are more recent, and therefore, may the nodes of the data tree that are associated with more-recent timestamp values would be more likely to overspill. This may cause the leaf nodes along these paths to further split, and so on, such that the data tree is disproportionately deeper along these nodes compared to other paths of the data tree. By splitting the data through two or more keys, the data classifier tree can be further grown in a relatively balanced way than a data tree split with a single key.

Moreover, in some instances, users of the data processing service 102 may request that the data files of the table be re-clustered using a new set of clustering keys. For example, in the example of FIG. 1B, the user may request that the data files be clustered using keys C3, C4, and C5 of the data table. In such an instance, the file management module 340 may generate a new data classifier tree clustered according to the new clustering keys.

The training module 345 trains one or more clustering key selection models to generate predictions for whether a key is a clustering key for a data table. The training process is described in conjunction with FIG. 4, which illustrates a training process of the clustering key selection model, in accordance with an embodiment. The clustering key selection model is substantially similar to the architecture shown in FIG. 1C, except that the parameters of the clustering key selection model of FIG. 4 have not been completely determined. The parameters are being trained during one or more iterations of a training process.

The training module 345 generates training data for training the clustering key selection model. The training data includes training instances. To generate a training instance, the training module 345 may retrieve, from the data storage system 110, a data table clustered according to clustering keys. The training module 345 may obtain a table schema from the data table that describes the keys of the data table, identify features of the data table (e.g., key names, key data types), and generate a series of tokens corresponding to the features. The training instance also includes labels indicating whether the key associated with the token is a clustering key for the data table. As the data from the data storage system 110 is already clustered, the training module 345 simply identifies the clustering keys from the clustered data and identifies the features that are a part of the clustering key. Therefore, the training instances making up the training data may include various data tables and clustering keys that are used to cluster the data files for these data tables across various entities or users of the data processing service 102. From this training data, the clustering key selection model, through the training process described below, is capable of learning the features that are technically advantageous to use as clustering keys for a new data table given the context of the set of features for that data table.

The training module 345 encodes each training instance as a series of tokens representing features of keys described in a particular table schema. The tokens may be dense vectors where relationships between features may be indicated by the closeness of their vectors or may be one-hot encoded vectors. The training module 345 also obtains a set of labels for each training instance, and in particular, a label for each respective key in the data table for that training instance. In one instance, a label of 1 indicates that a feature corresponds to a clustering key and a label of 0 indicates that a feature does not correspond to a clustering key. In some embodiments, the training module 345 may apply the labels of 0 and 1 to the first token and apply a label of −100 to the rest of the tokens for the key and to separation tokens. By tokens with −100, the training module 345 essentially informs the model to ignore the tokens in the training process.

Figure 4:
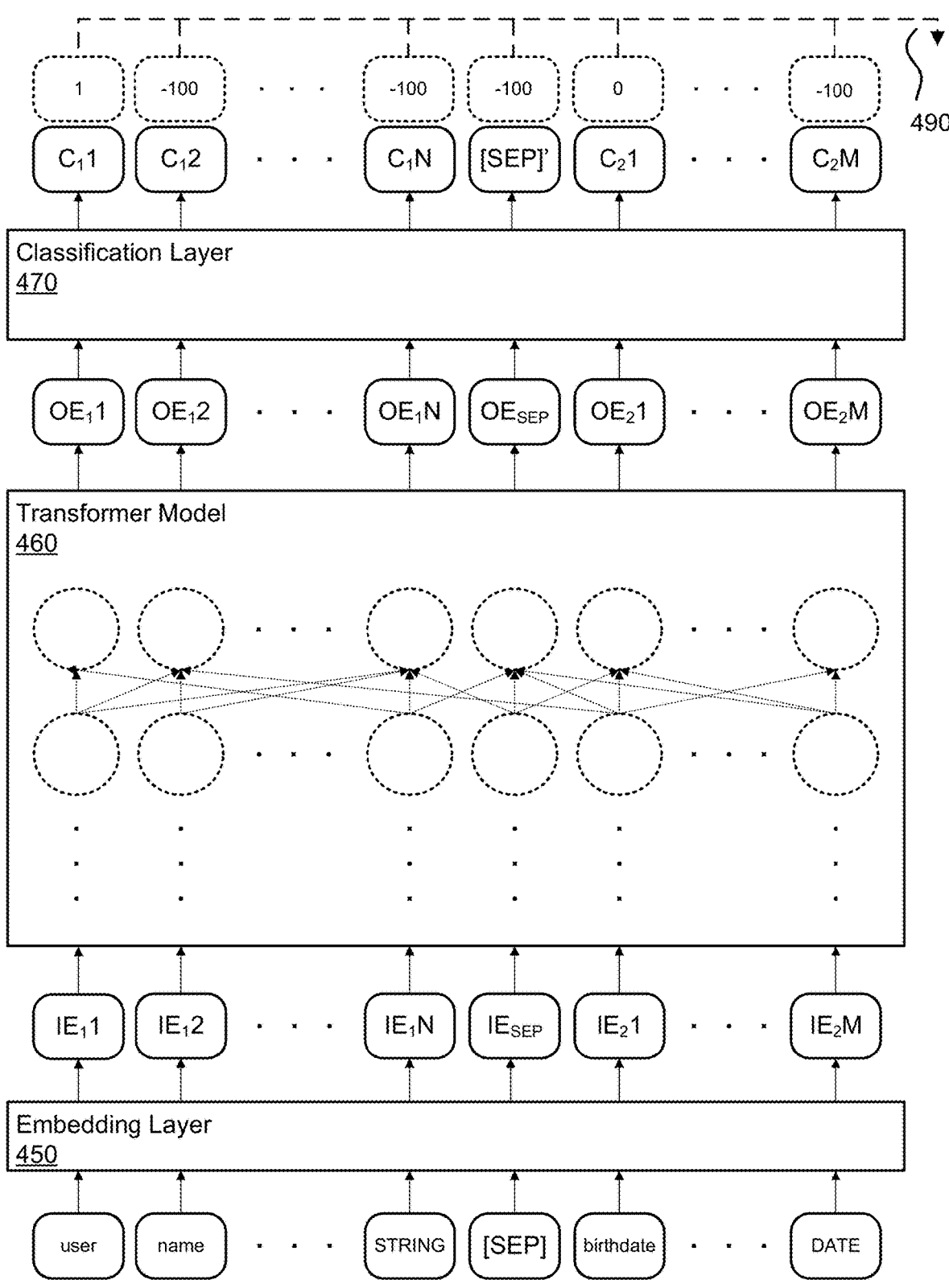
FIG. 4 illustrates a training process of the clustering key selection model, in accordance with an embodiment.

FIG. 4 illustrates a training instance for a data table containing a first key with name "user name" and data type "STRING" and a second key with name "birthdate" and data type "DATE." In this example, the key with name "user name" is a clustering key for the data table of the training instance, and the key with name "birthdate" is not a clustering key. The first three tokens in FIG. 4 correspond to features of the first key, the first token corresponding to "user," the second to "name," and the third to "STRING." The fourth token is a separation token. The last two tokens correspond to features of the second key, the fifth token corresponding to "birthdate" and the sixth token corresponding to "DATE."

In one embodiment, the training module 345 trains the clustering key selection model by repeatedly iterating between a forward pass step and a backpropagation step to reduce a loss function. The forward pass includes a pass through the clustering key selection model, or one pass through the embedding layer 450, the transformer model 460, and the classification layer 470. The training module 345 may perform the forward pass for a batch of training instances (e.g., batch containing data instances from multiple data tables). A batch includes a set of data points (e.g., 16-32 data points). A data point may correspond to a table schema for a particular user and in some embodiments, the set of data points may be data points corresponding to table schemas for different users.

In the forward pass step, the training module 345 applies parameters of the embedding layer 450 to the tokens of the training instance to generate input embeddings. The embedding layer 450 generates an input embedding for each token. For example, for the token corresponding to "user," the embedding layer 450 generates an input embedding $IE_1 1$.

The training module 345 applies parameters of the transformer model 460 to the input embeddings to generate output embeddings. The transformer model 460 generates an output embedding for each input embedding. For example, for the input embedding $IE_1 1$, the transformer model 460 generates an output embedding $OE_1 1$.

The training module 345 applies parameters of the classification layer 470 to the output embeddings to generate classification predictions. For each token, the classification layer 470 generates a classification prediction. For example, for the token $Tok_1 1$ with output embedding $OE_1 1$, the classification layer 470 generates a classification prediction $C_1 1$. In some embodiments, the classification layer 470 is a binary classifier including a linear neural network layer trained using cross-entropy loss.

The training module 345 determines a loss function. The loss 490 indicates the difference between the classification predictions and the corresponding classification labels for the training instance. The classification labels for the training instance in the example in FIG. 4 include 1, −100, −100, −100, 0, and −100. The first token for the key with the name "username" and data type "STRING" has a label of 1, indicating that the key is a clustering key. The first token for the key with the name "birthdate" and data type "DATE" has a label of 0, indicating that the key is not a clustering key. Note that the second and third tokens for the first key, "name" and "STRING," the separation key [SEP], and the second token for the second key, "DATE," all have label −100. As previously states, the label −100 indicates that the model should ignore these tokens in selecting clustering keys, as their labels are well below 0. The training module 345 may compute the difference between the classification predictions for each token and the corresponding classification labels as a cross-entropy loss. In one instance, the loss is given by:

$$Loss = \sum_{i=1}^{n} y_i \log(p_i)$$

where $y_i$ is the label for a particular training instance i and $p_i$ is the estimated classification prediction.

In the backpropagation step, the training module 345 updates the parameters of the embedding layer 450, the transformer model 460, and the classification layer 470 based on error terms from the loss function. The training module 345 may iterate the forward pass and backpropagation steps for multiple batches of training for a set number of epochs (e.g., three epochs) or until a convergence criterion is reached (e.g., change in loss between iteration is less than a threshold change). The training module 345 may store the trained clustering key selection model in the model database 350.

In some embodiments, the training module 345 may train the clustering key selection model on a pretrained model, such as a pretrained token classification model. The pretrained token classification model may be trained to classify tokens. The training module 345 may fine-tune the pre-trained token classification model to predict which keys described by a table schema are clustering keys by training the model on a data set including table schemas labelled by clustering keys.

LLM Assisted Clustering Key Selection

Figure 5:
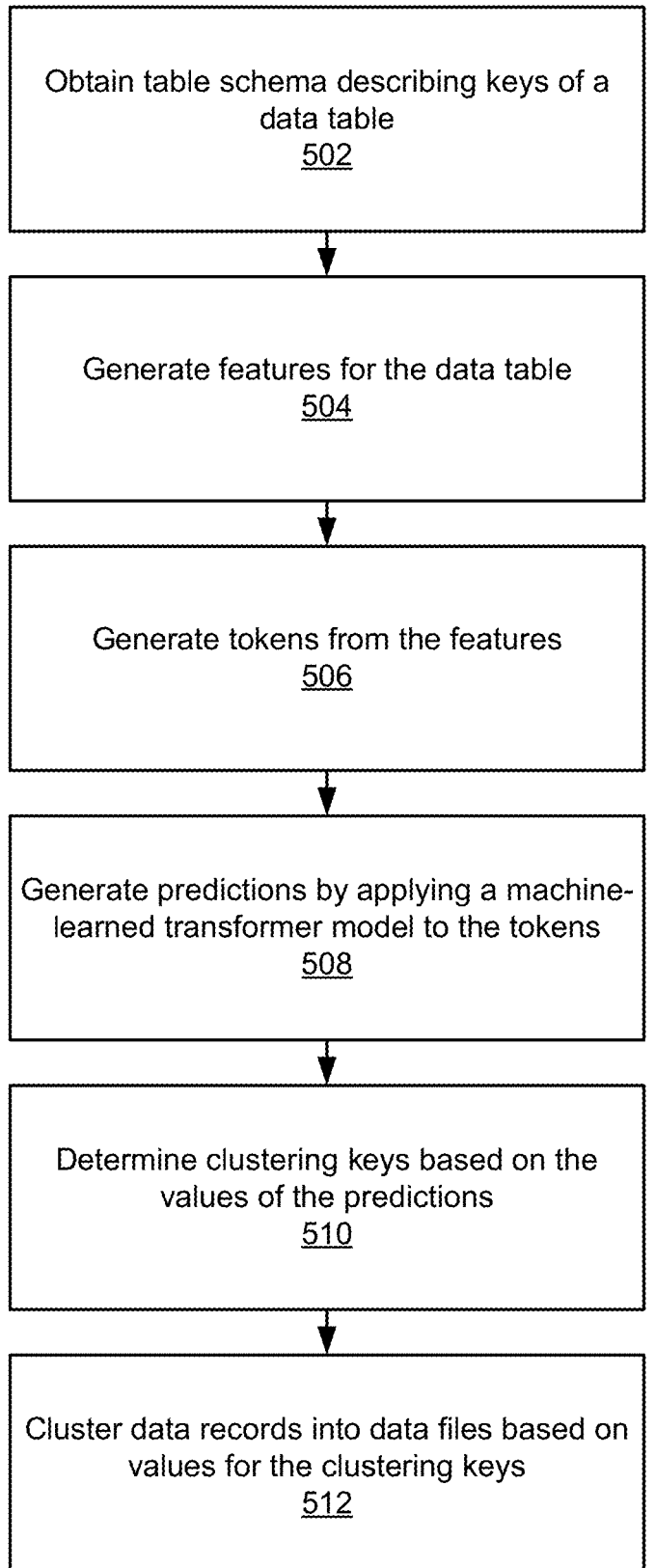
FIG. 5 is a flowchart of a method for selecting a clustering key using a LLM in accordance with an embodiment.

FIG. 5 is a flowchart of a method for selecting a clustering key using a LLM, in accordance with an embodiment. The process shown in FIG. 5 may be performed by one or more components (e.g., the control layer 106 or the file manage-ment module 340) of a data processing system/service (e.g., the data processing service 102). Other entities may perform some or all of the steps in FIG. 5. The data processing service 102 as well as the other entities may include some of the components of the machine (e.g., computer system) described in conjunction with FIG. 6. Embodiments may include different and/or additional steps, or perform the steps in different orders.

The control layer 106 obtains 502 a table schema corre-sponding to a data table. The data in the data table may be stored at a storage system associated with data processing service 102, for example stored in data layer 108 or data storage system 110. The table schema defines how the data is organized in a data table, describing at least one or more keys of the data table. Each key consists of both a name and a data type.

The control layer 106 generates 504 a set of features for the data table. The features for the data table include the features for each key. The features for each key include at least the name of the key and the data type associated with the key.

The control layer 106 generates 506 a set of tokens from the set of features. The set of tokens are numerical repre-sentations of the features. For each feature, the control layer 106 may generate one or more corresponding tokens. The control layer 106 may arrange the set of tokens in a series, for example starting with tokens corresponding to a first key, following with tokens corresponding to a second key, and so on for all keys described by the table schema.

The control layer 106 generates 508 a set of classification predictions by applying a machine-learned transformer model (e.g., a clustering key selection model) to the set of tokens. For each token, the machine-learned transformer model generates a classification prediction. A classification prediction is a numerical value that represents whether the key associated with the token is a clustering key for the data table.

The control layer 106 determines 510 one or more clus-tering keys based on values of the classification predictions for the tokens. The one or more clustering keys are a subset of the one or more keys. For each key, the control layer 106 may compute a clustering score based on the classification predictions of one or more tokens that correspond to features of the key. The control layer 106 may determine which of the keys are clustering keys based on the clustering scores for each key.

Figure 6:
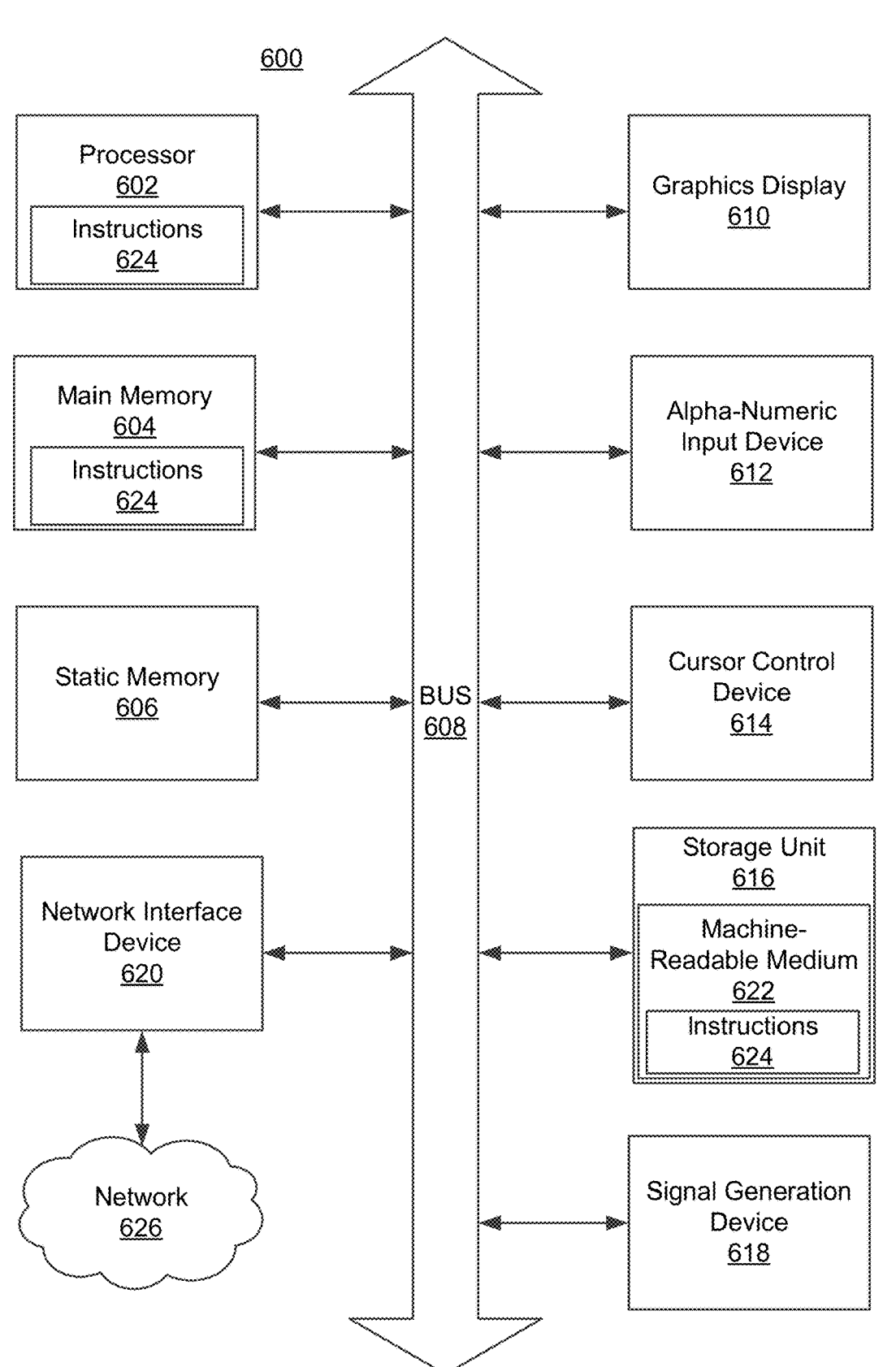
FIG. 6 is a block diagram illustrating an example machine to read and execute computer readable instructions, in accordance with an embodiment.

The control layer 106 clusters 512 records of the data table into one or more data files based on values for the one or more clustering keys. The control layer 106 may cluster the records with a data classifier tree (e.g., a KD-classifier tree) by recursively dividing the set of records of the data table according to key-values for each of the one or more clustering keys. Turning now to FIG. 6, illustrated is an example machine to read and execute computer readable instructions, in accordance with an embodiment. Specifi-cally, FIG. 6 shows a diagrammatic representation of the data processing service 102 (and/or data processing system)

in the example form of a computer system 600. The com-puter system 600 can be used to execute instructions 624 (e.g., program code or software) for causing the machine to perform any one or more of the methodologies (or pro-cesses) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal gen-eration device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include instructions for implementing the function-alities of the transaction module 330 and/or the file man-agement module 340. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626, such as the network 120, via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A computer-implemented method, comprising:
   obtaining a data table clustered according to a set of clustering keys among one or more keys of the data table;
   identifying a set of features for the data table, wherein for each key in the one or more keys of the data table, the set of features including at least a name label for the key;
   generating a set of tokens from the set of features, wherein the set of tokens are numerical representations of features in the set of features, each token associated with a respective key in the one or more keys;
   obtaining a set of labels for the one or more keys, wherein the set of labels includes a label for each key indicating whether the key is one of the set of clustering keys;
   generating a set of estimated predictions for the one or more keys by applying parameters of a transformer model to at least information obtained from the set of tokens;
   computing a loss function indicating a difference between the set of estimated predictions and the set of labels; and
   updating the parameters of the transformer model by backpropagating one or more terms obtained from the loss function.

2. The computer-implemented method of claim 1, wherein generating the set of estimated predictions by applying the transformer model to at least the information obtained from the set of tokens comprises:
   generating a set of estimated output embeddings for the set of tokens; and
   generating the set of estimated predictions by applying inputting the set of estimated output embeddings to a classifier model to generate the set of estimated predictions.

3. The computer-implemented method of claim 2, wherein a token in the set of tokens is a first token in a respective set of tokens encoding the name label of the key associated with the token, and wherein an estimated prediction for the key associated with the token is generated by applying the classifier model to an estimated output embedding for the token.

4. The computer-implemented method of claim 1, wherein the transformer model is configured as a bi-directional encoding representation from transformers (BERT) model.

5. The computer-implemented method of claim 1, wherein for each key in the one or more keys of the data table, and the set of features further includes a data type associated with the key.

6. The computer-implemented method of claim 1, further comprising:

obtaining a table schema including at least one or more keys of a second data table;

generating a second set of features for the second data table including name labels and data types associated with the one or more keys of the second data table;

generating a set of predictions by applying the transformer model to information obtained from the second set of features for the second data table;

identifying one or more clustering keys for the second data table based on the set of predictions; and clustering data records of the second data table into one or more data files based on key-values for the one or more clustering keys.

7. The computer-implemented method of claim 1, further comprising storing the parameters of the transformer model on a computer readable medium.

8. A non-transitory computer-readable medium comprising stored instructions, the instructions when executed by at least one processor of one or more computing devices, cause the one or more computing devices to:

obtain a data table clustered according to a set of clustering keys among one or more keys of the data table;

identify a set of features for the data table, wherein for each key in the one or more keys of the data table, the set of features including at least a name label for the key;

generate a set of tokens from the set of features, wherein the set of tokens are numerical representations of features in the set of features, each token associated with a respective key in the one or more keys;

obtain a set of labels for the one or more keys, wherein the set of labels includes a label for each key indicating whether the key is one of the set of clustering keys;

generate a set of estimated predictions for the one or more keys by applying parameters of a transformer model to at least information obtained from the set of tokens;

compute a loss function indicating a difference between the set of estimated predictions and the set of labels; and update the parameters of the transformer model by backpropagating one or more terms obtained from the loss function.

9. The non-transitory computer-readable medium of claim 8, wherein the instructions further cause the one or more computing devices to:

generate a set of estimated output embeddings for the set of tokens; and generate the set of estimated predictions by applying inputting the set of estimated output embeddings to a classifier model to generate the set of estimated predictions.

10. The non-transitory computer-readable medium of claim 9, wherein a token in the set of tokens is a first token in a respective set of tokens encoding the name label of the key associated with the token, and wherein an estimated prediction for the key associated with the token is generated by applying the classifier model to an estimated output embedding for the token.

11. The non-transitory computer-readable medium of claim 8, wherein the transformer model is configured as a bi-directional encoding representation from transformers (BERT) model.

12. The non-transitory computer-readable medium of claim 8, wherein for each key in the one or more keys of the data table, and the set of features further includes a data type associated with the key.

13. The non-transitory computer-readable medium of claim 8, wherein the instructions further cause the one or more computing devices to:

obtain a table schema including at least one or more keys of a second data table;

generate a second set of features for the second data table including name labels and data types associated with the one or more keys of the second data table;

generate a set of predictions by applying the transformer model to information obtained from the second set of features for the second data table;

identify one or more clustering keys for the second data table based on the set of predictions; and cluster data records of the second data table into one or more data files based on key-values for the one or more clustering keys.

14. The non-transitory computer-readable medium of claim 8, wherein the instructions further cause the one or more computing devices to store the parameters of the transformer model on a computer readable medium.

15. A computer system, comprising:

one or more computing devices; and a non-transitory computer-readable storage medium comprising instructions when executed by at least one processor of the one or more computing devices, cause the one or more computing devices to:

obtain a data table clustered according to a set of clustering keys among one or more keys of the data table;

identify a set of features for the data table, wherein for each key in the one or more keys of the data table, the set of features including at least a name label for the key;

generate a set of tokens from the set of features, wherein the set of tokens are numerical representations of features in the set of features, each token associated with a respective key in the one or more keys;

obtain a set of labels for the one or more keys, wherein the set of labels includes a label for each key indicating whether the key is one of the set of clustering keys;

generate a set of estimated predictions for the one or more keys by applying parameters of a transformer model to at least information obtained from the set of tokens;

compute a loss function indicating a difference between the set of estimated predictions and the set of labels; and update the parameters of the transformer model by backpropagating one or more terms obtained from the loss function.

16. The computer system of claim 15, wherein the instructions further cause the one or more computing devices to:

generate a set of estimated output embeddings for the set of tokens; and generate the set of estimated predictions by applying inputting the set of estimated output embeddings to a classifier model to generate the set of estimated predictions.

17. The computer system of claim 16, wherein a token in the set of tokens is a first token in a respective set of tokens encoding the name label of the key associated with the token, and wherein an estimated prediction for the key associated with the token is generated by applying the classifier model to an estimated output embedding for the token.

18. The computer system of claim 15, wherein the transformer model is configured as a bi-directional encoding representation from transformers (BERT) model.

19. The computer system of claim 15, wherein for each key in the one or more keys of the data table, and the set of features further includes a data type associated with the key.

20. The computer system of claim 15, wherein the instructions further cause the one or more computing devices to:

obtain a table schema including at least one or more keys of a second data table;

generate a second set of features for the second data table including name labels and data types associated with the one or more keys of the second data table;

generate a set of predictions by applying the transformer model to information obtained from the second set of features for the second data table;

identify one or more clustering keys for the second data table based on the set of predictions; and cluster data records of the second data table into one or more data files based on key-values for the one or more clustering keys.

\* \* \* \* \*